United States Patent [19]

Hunziker

[11] Patent Number: 4,844,232

[45] Date of Patent: Jul. 4, 1989

[54] INSTALLATION FOR THE SURFACE TREATMENT OF WORKPIECES

[76] Inventor: Werner Hunziker, Im Köpfli 262, CH-5054 Kirchleerau, Switzerland

[21] Appl. No.: 187,360

[22] Filed: Apr. 28, 1988

[30] Foreign Application Priority Data

May 8, 1987 [CH] Switzerland ............. 1770/87

[51] Int. Cl.$^4$ .................................................. B65G 47/24
[52] U.S. Cl. ............................................. 198/373; 198/658; 51/417; 134/120
[58] Field of Search .............. 198/373, 658; 134/65, 134/120, 132; 51/417, 419, 422

[56] References Cited

U.S. PATENT DOCUMENTS

| | | | |
|---|---|---|---|
| 966,403 | 8/1910 | Bodman | 134/132 |
| 967,938 | 8/1910 | Krause | 134/132 |
| 2,558,138 | 6/1951 | Johnson | 134/132 |
| 4,757,647 | 7/1988 | Hunziker | 51/417 |

*Primary Examiner*—Joseph E. Valenza
*Attorney, Agent, or Firm*—Peter K. Kontler

[57] ABSTRACT

An installation for the surface treatment of workpieces has a housing with a treatment chamber. The workpieces are conveyed through the chamber by an apparatus which continuously advances the workpieces while simultaneously tumbling the same. The apparatus includes an elongated, generally horizontal cage-like receptacle which extends through the chamber and a motor for rotating the receptacle on its longitudinal axis to thereby tumble the workpieces. The receptacle has an end wall to either side of the chamber and the end walls are joined to one another by a tubular shell made up of a series of elongated components such as rods or wires. The elongated components, which are parallel to the longitudinal axis of the receptacle, are circumferentially spaced so that a medium for the surface treatment of workpieces being tumbled in the shell can penetrate the latter. The end walls of the receptacle can be pivoted so that the normals to the end walls make an acute angle with the longitudinal axis of the receptacle and this results in lengthwise movement of the elongated components as the receptacle rotates. Such lengthwise movement causes the workpieces to advance through the treatment chamber as the workpieces are tumbled. The elongated components are connected to one another, at least in the portion of the shell which is located in the chamber, in order to strengthen the shell and to allow the latter to confine flat workpieces.

21 Claims, 4 Drawing Sheets

4,844,232

INSTALLATION FOR THE SURFACE TREATMENT OF WORKPIECES

CROSS-REFERENCE TO RELATED APPLICATION

This application contains subject matter similar to that of application Ser. No. 834,938 filed Feb. 28, 1986 by Werner Hunziker for "Apparatus for Surface Treatment of Discrete Workpieces", now U.S. Pat. No. 4,757,647, granted July 19, 1988.

BACKGROUND OF THE INVENTION

The invention relates generally to the surface treatment of workpieces.

More particularly, the invention relates to an apparatus for continuously advancing workpieces through a surface treatment zone while simultaneously rotating or tumbling the workpieces.

An apparatus of this type is described, for example, in the aforementioned U.S. Pat. No. 4,757,647. This apparatus has a cage-like receptacle for the workpieces and the receptacle is mounted for rotation on an at least approximately horizontal axis. The receptacle comprises a tubular shell or sheath made up of a multiplicity of circumferentially spaced, elongated components such as rods or wires which extend in parallelism with the rotational axis of the receptacle. The arrangement is such that, when the receptacle rotates, the elongated components move lengthwise as they travel upwards from the lowest point of the rotational path of the receptacle. This lengthwise movement of the components is in the intended direction of advance of the workpieces.

The known apparatus has the drawback that it cannot be used for the transport of flat, plate-like workpieces or heavy workpieces.

OBJECTS AND SUMMARY OF THE INVENTION

It is an object of the invention to provide a more versatile conveying and tumbling apparatus.

Another object of the invention to provide a conveying and tumbling apparatus of increased strength.

An additional object of the invention to provide an improved method of advancing and tumbling workpieces.

A further object of the invention to provide a conveying and tumbling apparatus which is capable of handling flat workpieces.

A concomitant object of the invention to provide a conveying and tumbling apparatus which can handle relatively heavy workpieces.

The preceding objects, as well as others which will become apparent as the description proceeds, are achieved by the invention.

One aspect of the invention resides in an apparatus for continuously advancing and changing the orientation of workpieces. The apparatus comprises an elongated receptacle rotatable on a predetermined axis and including a tubular shell or sheath having a plurality of circumferentially spaced, elongated components, e.g., rods or wires, extending in substantial parallelism with such axis. The shell has a pair of longitudinal end portions and another portion intermediate the end portions, and the receptacle further includes means disposed at least partly in the intermediate portion of the shell and serving to connect individual components to one another. Means is provided to rotate the receptacle and move the components lengthwise.

Workpieces introduced into the receptacle are transported in a predetermined direction when the receptacle rotates and the arrangement is such that the components move lengthwise in this direction when the components travel through a specific part of the rotational path of the receptacle. The rotational axis of the receptacle is preferably at least approximately horizontal and the components then move lengthwise in the predetermined direction as they travel upwards from the lowest point of the rotational path of the receptacle.

The apparatus may be employed to advance the workpieces through a zone or station in which the workpieces undergo a surface treatment. If the workpieces are to be conveyed through several treatment stations, it may be desirable to make the receptacle very long so that the receptacle can traverse all of these stations. This may be accomplished by supporting the intermediate portion of the shell on one or more bands, preferably endless bands which are free to rotate in response to rotation of the receptacle. In this manner, the receptacle may be made virtually as long as desired while bending of the latter under the weight of the workpieces is inhibited.

The novel features which are considered as characteristic of the invention are set forth in particular in the appended claims. The improved conveying and tumbling apparatus itself, however, both as to its construction and its mode of operation, together with additional features and advantages thereof, will be best understood upon perusal of the following detailed description of certain specific embodiments when read in conjunction with the accompanying drawings.

DESCRIPTION THE PREFERRED EMBODIMENTS

Figure 1:
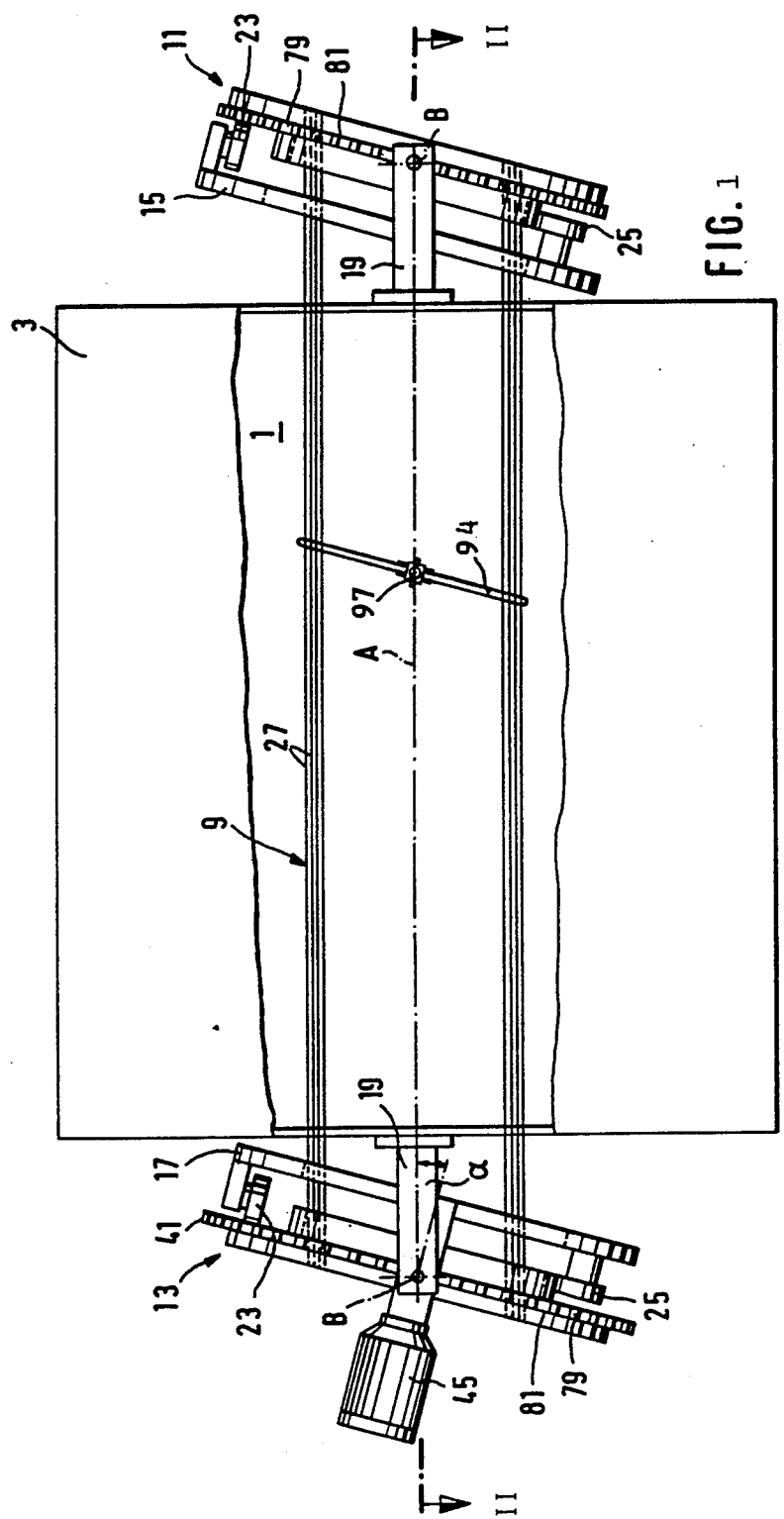
FIG. 1 is a partly broken away plan view of a conveying and tumbling apparatus according to the invention.
Figure 2:
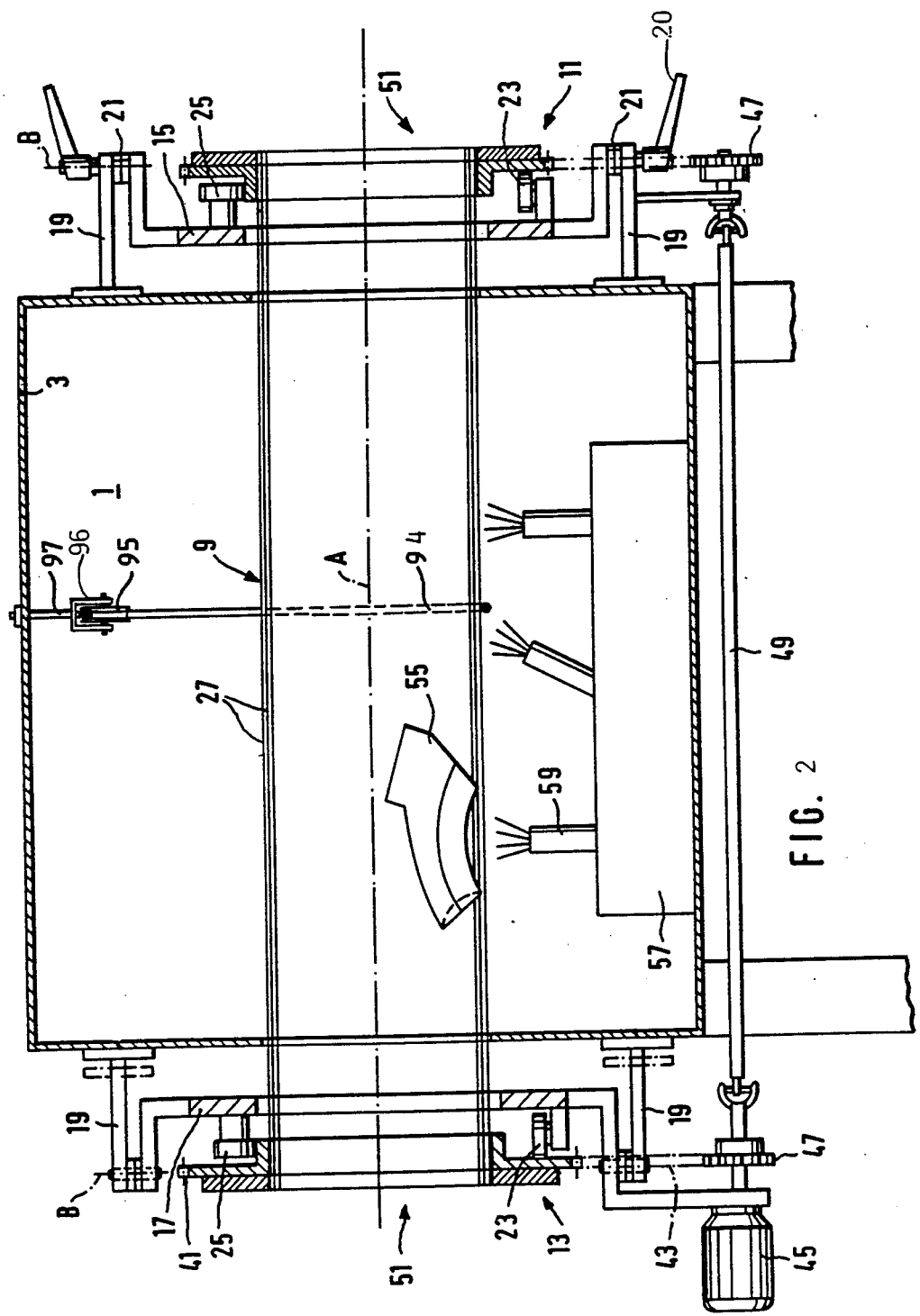
FIG. 2 is a sectional view as seen in the direction of arrows II—II of FIG. 1.

Referring to FIGS. 1 and 2, the reference numeral 3 identifies a housing or casing which encloses a chamber or station 1 for the surface treatment of workpieces 55. The workpieces 55 are accommodated in a cage-like receptacle 9 which traverses the treatment chamber 1 and is mounted for rotation on an axis A. The axis A, which constitutes the longitudinal axis of the receptacle 9, extends horizontally or approximately horizontally. The length of the receptacle 9 exceeds that of the treatment chamber 1 so that the longitudinal ends of the receptacle 9 are located externally of the chamber 1 to either side of the latter. The longitudinal ends of the receptacle 9 are respectively constituted by annular end walls 11 and 13 which are supported by respective disc-like carriers 15 and 17. The disc-like carriers 15, 17 are mounted on holders 19 which, in turn, are secured to the housing 3. Each of the disc-like carriers 15, 17 is pivotable on a vertical axis B via adjusting means including toothed or serrated arresting elements 21 and one or more adjusting handles 20. The adjusting means 20,21 allows the disc-like carriers 15,17 to be rotated to and held in any of a plurality of angular positions such that the normals to the end walls 11,13 define an angle alpha with the rotational axis A of the receptacle 9.

At least three rollers 23 are journalled on each of the disc-like carriers 15,17. The geometric axes of the rollers 23 on the disc-like carrier 15 intersect the axis A at a first point while the geometric axes of the rollers 23 on the disc-like carrier 17 intersect the axis A at a second point. Three additional rollers 25 are also journalled on each of the disc-like carriers 15,17 and the axes of the rollers 25 are perpendicular to the pivot axes B of the carriers 15,17. The rollers 23,25 together form antifriction bearings for the respective end walls 11,13 of the receptacle 9.

Each or the end walls 11,13 is made up of two rings which are fixed to one another. One of these rings is identified by the reference numeral 81 and constitutes a carrier ring. The other ring, which is identified by the reference numeral 79, has an L-shaped cross section and constitutes a bearing ring. The two legs of the L-shaped ring 79 are provided with bearing surfaces and the rollers 23,25 ride on such surfaces.

In addition to the end walls 11 and 13, the receptacle 9 further comprises a tubular shell or sheath which extends between the end walls 11,13. The shell includes a multiplicity of circumferentially spaced, elongated components 27 which may take the form of rods, bars, cables, coiled wire strands, straight wire strands, and so on. The components 27 are parallel to one another and to the rotational axis A of the receptacle 9 and each of the components has a pair of longitudinal end portions which are secured to the respective end walls 11,13 of the receptacle 9. Each of the components 27 further has another portion intermediate the end portions thereof and located in the treatment chamber 1. The components 27 are in tension so that the end walls 11,13 are braced with respect to one another and drawn towards the respective disc-like carriers 15,17.

The end portions of the components 27 may be anchored to the end walls 11,13. The anchoring means then advantageously includes conical bores which allow limited deflection without bending.

An annular pinion 41 is formed on that side of each end wall 11,13 nearest the housing 3. A chain or toothed belt 43 is trained over each of the pinions 41 and each chain or belt 43 further engages a respective second pinion 47. The two pinions 47 are connected to one another by a drive shaft 49 and the pinions 47, as well as the drive shaft 49, are driven by a motor 45.

The pinions 41 may consist of a hardened material and define bearing surfaces for the rollers 23.

Each of the end walls 11,13 has a circular° aperture or opening 51 which is centered with reference to the end walls 11,13 and with reference to the shell connecting the same. The components 27 of the shell are preferably arranged such that the latter is cylindrical and the spacing between neighboring components 27 is selected in dependence upon the masses and sizes of the workpieces 55 to be processed.

The housing 3 accommodates means for subjecting the workpieces 55 in the chamber 1 to a surface treatment. By way of example, the surface treatment means is here shown as being in the form of a spraying device 57 which is disposed in the housing 3 below the receptacle 9 and is provided with three spray nozzles 59. The spray nozzles 59 are directed towards the receptacle 9 and the sprays from the nozzles 59 pass through the gaps between neighboring components 27 of the receptacle 9 to impinge upon the workpiece or workpieces 55 located in the receptacle 9.

The receptacle 9; disc-like carriers 15,17; rollers 23,25; arresting elements 21 and handles 20; chains or belts 43; pinions 47; drive shaft 49; and motor 45 all constitute parts of an apparatus for continuously advancing the workpieces 55 along the direction defined by the axis A and for continuously tumbling, or changing the orientation of, the workpieces 55.

In operation of the apparatus, the workpieces 55 to be processed are introduced into the receptacle 9 by hand or by a conveyor. The handles 20 are manipulated in order to pivot the disc-like carriers 15,17 to respective positions in which the normals to the end walls 11,13 make the desired angle alpha with the rotational axis A of the receptacle 9. The motor 20 is then set into operation to thereby rotate the receptacle 9 on the axis A. Rotation of the receptacle 9 causes the workpieces 55 in the latter to tumble so that the workpieces 55 continuously undergo changes in orientation.

Since the end walls 11,13 are positioned in such a manner that the normals to the end walls 11,13 are inclined to the axis A at the angle alpha, rotation of the receptacle 9 further results in lengthwise movement of the components 27 relative to one another. As each component 27 travels upwards from the lowest point of the rotational path of the receptacle 9, it moves lengthwise to the right or the left as viewed in FIGS. 1 and 2. This lengthwise movement causes the workpieces 55 to advance and the direction of advance corresponds to the direction of such movement. The direction of lengthwise movement of the components 27, and hence the direction of advance of the workpieces 55, depend upon the sense in which the receptacle 9 is rotated and the sense in which the disc-like carriers 15,17 are pivoted so as to cause the normals to the end walls 11,13 to be inclined to the axis A.

Due to the tumbling motion and simultaneous advancement of the workpieces 55, the latter are subjected to the action of the spray nozzles 59 uniformly and from all sides. The distances between the spray nozzles 59 and the surfaces of the workpieces 55 remain almost constant, regardless of the sizes of the workpieces 55, because essentially only those surfaces which rest on the components 27 and face the spray nozzles 59 are treated. The dwell time of the workpieces 55 in the treatment chamber 1, as well as the dwell time over the individual spray nozzles 59, can be regulated by adjusting the rotational speed of the receptacle 9 and the angle alpha between the axis A and the normals to the end walls 11,13.

In accordance with one feature of the invention, the components 27 mutually support or reinforce one another. This may be achieved by providing the receptacle 9 with means for connecting individual ones of the components 27 to each other. Such connecting means is at least partly disposed in the intermediate portion of the shell formed by the components 27, that is, the portion of the shell located inside the treatment chamber 1.

Figure 3:
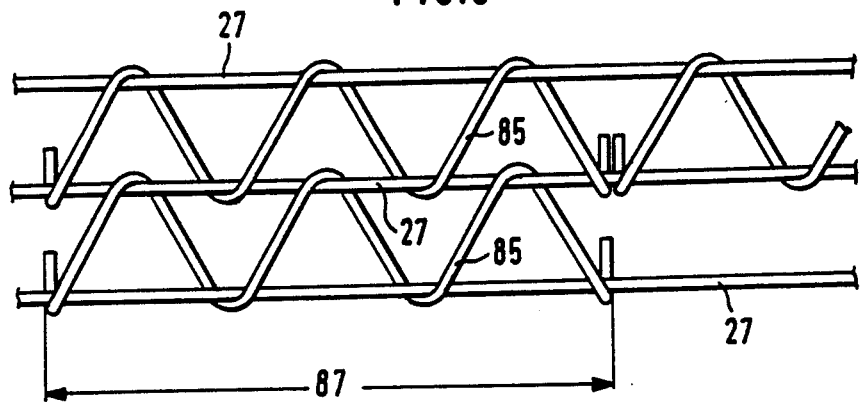
FIG. 3 is an enlarged fragmentary view of one embodiment of a receptacle for use in the apparatus of FIG. 1.

FIG. 3 illustrates one embodiment of the connecting means. The connecting means here comprises a series of wires or strands 85 each of which is helically wound about two neighboring components 27. In FIG. 3, each strand 85 has a length 87 smaller than the length of the components 27 and every pair of neighboring components 27 is connected by several strands 85 which are arranged side-by-side and adjoin one another. Alternatively, every pair of neighboring components 27 may be joined by an unbroken strand 85 which extends over the entire length of the components 27. The components 27 and strands 85 are advantageous not fixed to each other so that the components 27 can move back-and-forth lengthwise relative to the strands 85 with little resistance.

Figure 4:
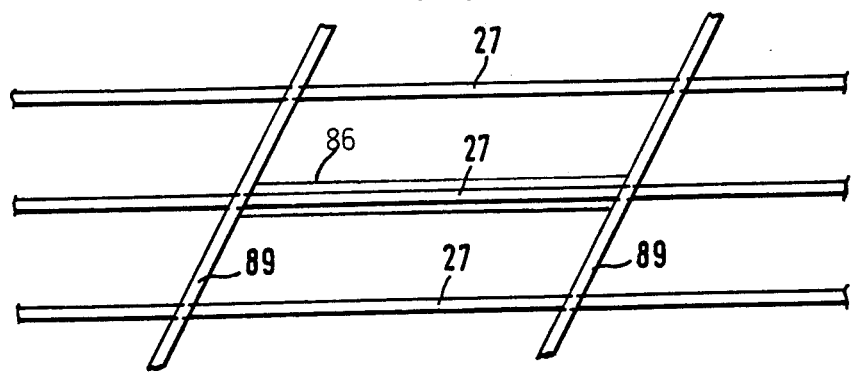
FIG. 4 is similar to FIG. 3 but shows another embodiment of the receptacle.

Another embodiment of the connecting means for mutual reinforcement of the components 27 is shown in FIG. 4. The connecting means of FIG. 4 includes one or more rings 89 which may be, or are, parallel to the end walls 11,13. Each of the rings 89 is formed with a set or annulus of openings such as the opening 88 of FIG. 6. The number of openings in a ring 89 is equal to the number of components 27 and each of the openings is designed to receive one of the components 27 with clearance. The openings of neighboring rings 89 are in axial register and the components 27 pass through the registering openings. Due to the fact that the components 27 are received in the openings with clearance, the rings 89 can undergo limited pivotal movement relative to the components 27 and the components 27 can shift lengthwise relative to the rings 89 without much resistance.

Spacing means may be provided to maintain neighboring rings 89 at a predetermined distance from one another. The spacing means may take the form of clip-like or tubular spacers 86.

Spacing means may be provided to maintain neighboring rings 89 in desired positions relative to, or at a predetermined distance from, one another. The spacing means may take the form of clip-like or tubular spacers 86 which are slid onto several selected ones of the components 27.

Figure 5:
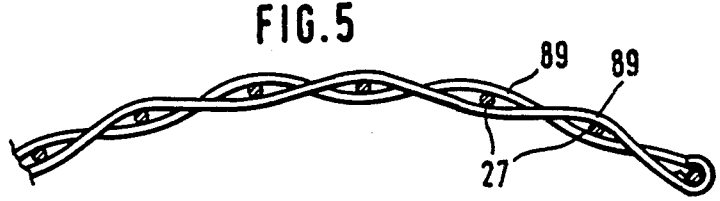
FIG. 5 is a transverse sectional view of an additional embodiment of the receptacle.

The rings 89 of FIG. 4 are in the form of circumferentially endless discs. FIG. 5 illustrates an embodiment in which the rings 89 are open, i.e., not endless.

The rings 89 of FIG. 5 are constituted by wire segments of finite length, that is, wire segments having two ends. Each wire segment extends circumferentially of the shell formed by the components 27 and alternately passes to the inside and outside of consecutive components 27, i.e., each wire segment passes to that side of a first component 27 which faces the interior of the receptacle 9 and to that side of a neighboring component 27 which faces the exterior of the receptacle 9. The ends of each wire segment are advantageously shaped so as to define eyelets or loops and each such eyelet or loop receives a component 27. Preferably, the eyelets or loops of all wire segments engage a common component 27.

Neighboring ones of the wire rings 89 are offset relative to one another circumferentially of the shell formed by the components 27. The offset is such that a first wire ring 89 passes to the inside of any given component 27 while a neighboring wire ring 89 passes to the outside of this component.

As before, it is preferred that the components 27 and wire rings 89 not be fixed to one another so that the components 27 can move lengthwise relative to the rings 89.

Figure 6:
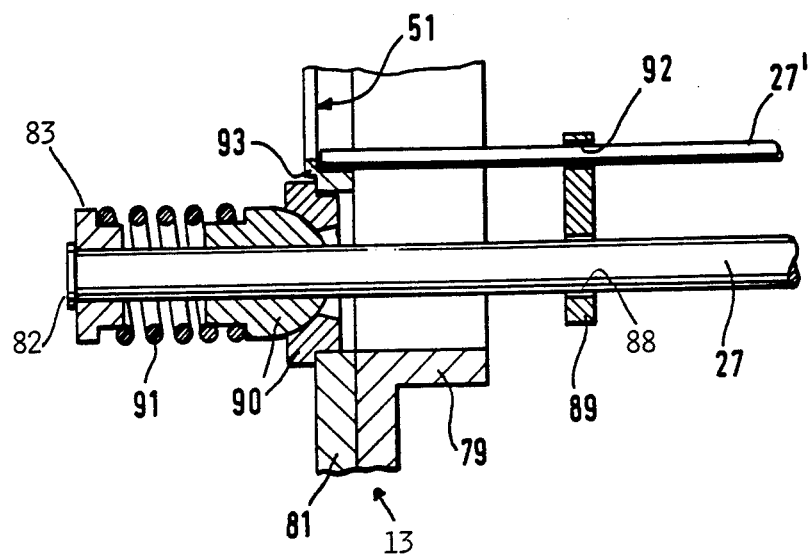
FIG. 6 is an enlarged fragmentary view of a further embodiment of the receptacle.

FIG. 6 shows details of a means for securing the respective end portion of a component 27 to the end wall 13. A similar means may be used to secure the other end portion of the component 27 to the end wall 11.

As seen in FIG. 6, a ball joint 90 is mounted on the carrier ring 81 of the end wall 13. The end portion of the component 27 projects through and beyond the ball joint 90 and a spring 91 as well as an abutment ring 83 are mounted on the projecting part of the component 27. The spring 91 is confined between the ball joint 90 and the abutment ring 83 and the latter is held on the projecting part of the component 27 by a head 82 formed on the end face of the component 27. The spring 91 is in compression so that the component 27 is prestressed in tension.

In FIG. 6, the connecting means for mutual reinforcement or support of the components 27 again comprises one or more disc-like rings 89. Each of the disc-like rings 89 is, as previously, provided with a set or annulus of openings 88 which are designed to receive the components 27 with clearance. The openings 88 of neighboring disc-like rings 89 are in axial register and the components 27 extend through the registering openings 88. The number of openings 88 in a disc-like ring 89 equals the number of components 27.

FIG. 6 illustrates that steps or discontinuities exist inside the receptacle 9 between the components 27 and the free areas of the central apertures 51. These steps or discontinuities, which extend upwards from the components 27 in the region of the lowermost point of the rotational path of the receptacle 9, can interfere with discharge of the workpieces 55 from the receptacle 9.

In order to eliminate the steps or discontinuities, the disc-like rings 89 are provided with a second set or annulus of openings 92 radially inwards of the openings 88. The openings 92 are symmetrically arranged about the rotational axis A of the receptacle 9 and the annulus of openings 92 is concentric with the annulus of openings 88. The openings 92 of neighboring disc-like rings 89 are in axial register and additional elongated components 27', e.g., rods or bars, extend through the registering openings 92. The ends of the additional components 27' are free and bound the free areas of the central apertures 51. The additional components 27' are held against undesired lengthwise shifting by arresting elements 93 which may include annular ribs, lips and so on.

The additional components 27', which are circumferentially spaced and extend in parallelism with the components 27, define a cage-like inner shell or sheath which is parallel to the outer shell formed by the components 27 but has a smaller diameter or cross-sectional area. This inner shell is centered with respect to the outer shell and with respect to the apertures 51 and the inner diameter or cross-sectional area of the inner shell is no greater, and preferably smaller, than the diameter or cross-sectional area of the apertures 51.

The number of additional components 27' may be a multiple of the number of components 27. Advantageously, the diameter or cross-sectional area of the additional components 27' is substantially smaller than the diameter or cross-sectional area of the components 27. The length of the additional components 27' is equal, or approximately equal, to that of the receptacle 9.

The disc-like rings 89 may be of one piece or may be composed of a plurality of arcuate segments. In the latter case, it is of advantage for the segments to be articulately connected to one another.

If the receptacle 9 is to extend through more than one treatment chamber 1, it may be necessary for the receptacle 9 to be of great length. As illustrated in FIGS. 1 and 2, the receptacle 9 is then advantageously supported at one or more locations by a supporting band or belt 94 which is preferably endless and may take the form of a nylon cable, a roller chain, and so on. The supporting band 94 passes around the receptacle 9 and also around a deflecting roller 95. The deflecting roller 95 is freely rotatable on an inverted U-shaped bearing member 96 which is suspended from the top of the housing 3 by a vertical shaft 97. The bearing member 96 is pivotable about the shaft 97. During operation of the apparatus including the receptacle 9, the latter drives the supporting band 94 so that the supporting band 94 rotates with the receptacle 9.

The use of one or more supporting bands 94 makes it possible to inhibit bending of the receptacle 9 even when the receptacle 9 is subjected to heavy loads.

The mutual support or reinforcement of the components 27 achieved in accordance with the invention allows flat workpieces as well as heavy workpieces to be transported through the receptacle 9.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for continuously advancing and changing the orientation of workpieces, comprising an elongated receptacle rotatable on a predetermined axis and including a tubular shell having a plurality of circumferentially spaced, elongated components extending in substantial parallelism with said axis, said shell having a pair of longitudinal end portions and another portion intermediate said end portions, and said receptacle further including means for connecting individual components to one another, said connecting means being at least partly disposed in said other portion to mutually support one another; and means for rotating said receptacle and moving said components lengthwise.

2. The apparatus of claim 1, wherein said axis is at least approximately horizontal.

3. The apparatus of claim 1, wherein said connecting means is designed to permit lengthwise movement of the respective components relative to said connecting means.

4. The apparatus of claim 1, wherein said connecting means comprises a strand which is helically wound about a pair of components.

5. The apparatus of claim 1, wherein said connecting means comprises a ring-like member.

6. The apparatus of claim 5, wherein said member is provided with openings for said components and the latter pass through the respective openings.

7. The apparatus of claim 5, wherein said member comprises a circumferentially extending strand which alternately passes to the inside and outside of said components.

8. The apparatus of claim 7, wherein said strand has two ends and each of said ends is connected to one of said components.

9. The apparatus of claim 8, wherein said ends are connected to the same component.

10. The apparatus of claim 5, wherein said connecting means comprises a plurality of ring-like members; and further comprising means for spacing neighboring members from one another longitudinally of said receptacle.

11. The apparatus of claim 10, wherein said spacing means comprises at least one spacer mounted on one of said components.

12. The apparatus of claim 5, wherein said member is provided with first openings, and second openings radially inwardly of said first openings, said components passing through respective ones of said first openings; and further comprising a plurality of additional elongated components extending in substantial parallelism with said axis, said additional components passing through respective ones of said second openings.

13. The apparatus of claim 12, wherein the lengths of said additional components approximate the length of said receptacle.

14. The apparatus of claim 12, wherein said first openings define a first annulus and said second openings define a second annulus which is substantially concentric with said first annulus.

15. The apparatus of claim 12, further comprising means for fixing said additional components against lengthwise movement.

16. The apparatus of claim 12, wherein said connecting means comprises a plurality of ring-like members each of which is provided with first openings, and second openings radially inwardly of the respective first openings, the components of said shell passing through respective ones of said first openings and said additional components passing through respective ones of said second openings, and each second opening of a ring-like member being substantially in register with a second opening of a neighboring ring-like member.

17. The apparatus of claim 12, wherein said receptacle has a pair of longitudinal ends and at least one of said ends has an aperture of predetermined cross-sectional area designed for the passage of workpieces therethrough, said additional components defining an internal shell having an inner cross-sectional area at most equal to said predetermined cross-sectional area.

18. The apparatus of claim 17, wherein said shells are substantially concentric and said aperture is substantially centered with reference to said shells.

19. The apparatus of claim 1, further comprising a band which supports said other portion of said shell.

20. The apparatus of claim 19, wherein said band is endless.

21. The apparatus of claim 20, further comprising means mounting said band for free rotation in response to rotation of said receptacle.

* * * * *